United States Patent
Matteucci et al.

(10) Patent No.: US 11,379,895 B1
(45) Date of Patent: Jul. 5, 2022

(54) SYSTEM AND METHOD FOR FLORAL ARRANGEMENT CUSTOMIZATION

(71) Applicants: Rose Elizabeth Matteucci, Castro Valley, CA (US); Carlo Matteucci, Castro Valley, CA (US)

(72) Inventors: Rose Elizabeth Matteucci, Castro Valley, CA (US); Carlo Matteucci, Castro Valley, CA (US)

( * ) Notice: Subject to any disclaimer, the term of this patent is extended or adjusted under 35 U.S.C. 154(b) by 0 days.

(21) Appl. No.: 16/442,487

(22) Filed: Jun. 15, 2019

Related U.S. Application Data

(63) Continuation of application No. 14/078,504, filed on Nov. 12, 2013, now Pat. No. 10,325,302.

(60) Provisional application No. 61/725,872, filed on Nov. 13, 2012.

(51) Int. Cl.
    *G06Q 30/06* (2012.01)

(52) U.S. Cl.
    CPC ..... *G06Q 30/0621* (2013.01); *G06Q 30/0643* (2013.01)

(58) Field of Classification Search
    None
    See application file for complete search history.

(56) References Cited

U.S. PATENT DOCUMENTS

| | | | |
|---|---|---|---|
| 2,700,848 A | 2/1955 | Reynolds | |
| 7,162,438 B1 * | 1/2007 | Kelly | G06Q 10/06315 |
| | | | 705/7.25 |
| 7,263,800 B2 | 9/2007 | Taddeo | |
| 7,519,549 B1 * | 4/2009 | Johnson | G06Q 10/087 |
| | | | 235/383 |
| 8,954,875 B2 | 2/2015 | Fingerer | |
| 2002/0059186 A1 * | 5/2002 | Weber | G06Q 40/04 |
| 2002/0068262 A1 * | 6/2002 | Robinson | G09B 25/08 |
| | | | 434/93 |
| 2005/0273470 A1 | 12/2005 | Heigold | |
| 2006/0095331 A1 * | 5/2006 | O'Malley | G06F 16/9574 |
| | | | 705/22 |
| 2006/0224327 A1 * | 10/2006 | Dunlap | G06Q 30/02 |
| | | | 702/19 |
| 2009/0063302 A1 | 3/2009 | Greenwald | |
| 2010/0156045 A1 | 6/2010 | Kahn | |

(Continued)

FOREIGN PATENT DOCUMENTS

| | | |
|---|---|---|
| AU | 2007202196 | 1/2008 |
| AU | 2007202196 A1 * | 1/2008 |

OTHER PUBLICATIONS

K. Suzuki, Xinlei Wang and H. Ikeda, "An artistic design system for industrial product image retrieval," in IEEE Industry Applications Magazine, vol. 8, No. 1, pp. 29-36, Jan.-Feb. 2002, doi: 10.1109/ 2943.974355. (Year: 2002).*

(Continued)

*Primary Examiner* — Michelle T Kringen
(74) *Attorney, Agent, or Firm* — Roark IP

(57) ABSTRACT

A floral arrangement customization system allows a user to modify characteristics of each stem or groups of stems within a template to create a customized floral arrangement. The user can also modify characteristics about the arrangement such as its style, shape, or color scheme. Information about the customized floral arrangement is transmitted to an order fulfiller who can assemble the floral arrangement exactly according to the customized design.

17 Claims, 12 Drawing Sheets

(56) References Cited

U.S. PATENT DOCUMENTS

| | | |
|---|---|---|
| 2010/0234979 A1 | 9/2010 | Katano |
| 2011/0071919 A1 | 3/2011 | Spry |
| 2012/0198387 A1* | 8/2012 | Henry .................... G06T 19/00 715/845 |
| 2012/0294514 A1* | 11/2012 | Saunders ........... G06K 9/00677 382/159 |

OTHER PUBLICATIONS

Sun, Jing, et al. "Template-based generation of road networks for virtual city modeling." Proceedings of the ACM symposium on Virtual reality software and technology. ACM, 2002. (Year: 2002).

* cited by examiner

SYSTEM AND METHOD FOR FLORAL ARRANGEMENT CUSTOMIZATION

CROSS-REFERENCE TO RELATED APPLICATIONS

This application claims the benefit of U.S. patent application Ser. No. 14/078,504, filed Nov. 12, 2013; which claims the benefit of U.S. Provisional Patent Application Ser. No. 61/725,872, filed Nov. 13, 2012. Both of these applications are incorporated herein by reference.

FIELD OF THE DISCLOSURE

The present disclosure relates generally to arranging flowers, and in particular to a system and method for customizing floral arrangement designs in a precise and repeatable manner.

BACKGROUND

Floral arrangements that provide groupings of one or many types of flowers and plants are well known. They can be used as decorations for events such as weddings or funerals, given as gifts to loved ones, enjoyed during holidays or celebrations, or used for many other purposes. Customers who wish to purchase a floral arrangement normally have been limited to purchasing pre-made arrangements at stores or using florists to create arrangements for them. Customers who use florists generally select an arrangement design based on photographs from a book, catalog, or website, or tell the florist the type of design or types of flowers the customer desires. However, it is the florist, not the customer, who actually selects each individual flower and determines where to place it within an arrangement. The florist often needs to interpret a two dimensional photograph into a three dimensional physical floral arrangement. The florist can also decide to substitute flowers similar in appearance to the ones selected by the customer based on need or on available inventory. As a result, the final arrangement often looks different than the photographed design the customer selected or the customized design the customer had in mind. Requiring the customer to pick a design from a book or catalog can also be problematic because the books or catalogs can be heavy, bulky and have a limited number of designs. Books and catalogs can also become quickly outdated, which requires that new books or catalogs be printed periodically.

SUMMARY

Aspects of this disclosure include a system comprising: a network interface unit configured to communicate with a network; a plurality of processors, each with an associated memory, in communication with the network interface unit and capable of: receiving input selecting arrangement characteristics of a floral arrangement; providing a virtual template comprising a plurality of spaces which correspond to the arrangement characteristics; loading the plurality of spaces with preconfigured stem characteristics; and modifying the stem characteristics in accordance with received input to create a modified floral arrangement.

Another aspect of the disclosure is a system for designating a plurality of individual floral components of an entire floral composition comprising: a network interface unit configured to communicate with a network; a processor with an associated memory in communication with the network interface unit and capable of: presenting a pre-set floral composition model wherein the plurality of individual floral components may be manipulated; receiving input regarding a first portion of the plurality of individual floral components with regard to arrangement characteristics and stem characteristics; and receiving a request that a second portion of the plurality of individual floral components be randomly selected.

Another aspect of the disclosure is a method performed on one or more processing devices comprising: receiving input selecting arrangement characteristics of a floral arrangement; providing a virtual template comprising a plurality of spaces which correspond to the arrangement characteristics; loading the plurality of spaces with preconfigured stem characteristics; and modifying the stem characteristics in accordance with received input to create a modified floral arrangement.

DETAILED DESCRIPTION

What is needed is a system and method for floral arrangement customization and stem designation, identification and/or regulation. More specifically, described herein is a system and method by which a customer can personally design or customize a floral arrangement by selecting parameters such as the exact location, color, species, angle, height, or other characteristic of each flower, plant, or other item within an arrangement, such that when the arrangement is assembled by a florist or other person the arrangement will exactly match the design selected by the customer (i.e., a customization system).

Figure 1:
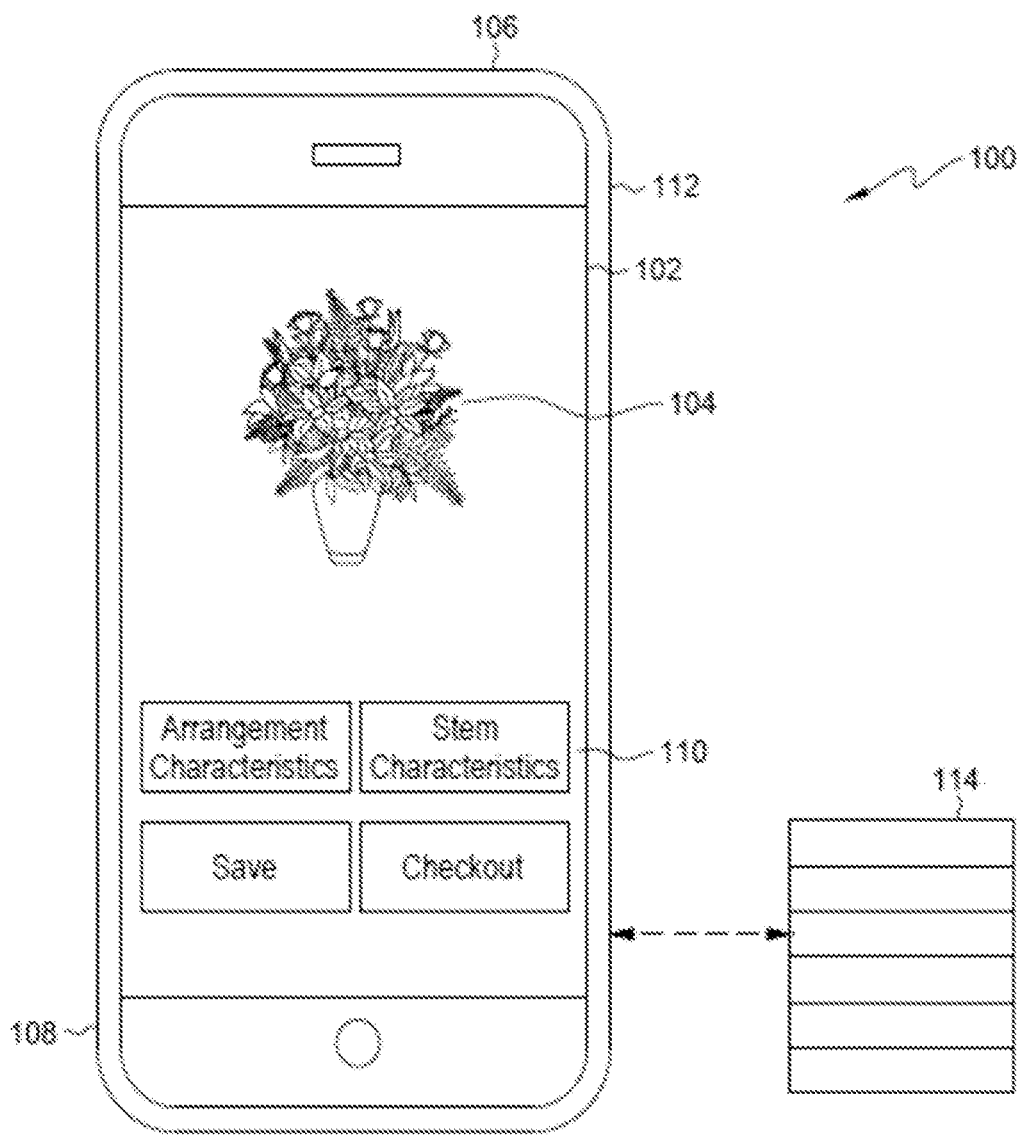
FIG. 1 depicts an embodiment of a terminal through which a user can interact with a system for customizing a floral arrangement.

FIG. 1 depicts an embodiment of a terminal 100 through which a user can interact with the customization system for customizing a floral arrangement. "Arrangement(s)" as used in this disclosure shall refer to any composition or grouping of: flowers, stems, bouquet or vase/floral container inserts, flowers, flora elements or flower-like items or alike. The terminal 100 can be a machine comprising a screen 102, at least one input device 104, a transmission mechanism 106, and a microprocessor 108. The terminal 100 can be a kiosk, a computer, a mobile phone, a tablet computer, a display connected to a server, a television, a video game console, any device capable of running a web browser, any device capable of running a program or application, or any other device capable of communicating with the customization system described herein. The screen 102 can be any digital or analog monitor, display, or projector capable of displaying an image. The at least one input device 104 can be a touch screen, a stylus, a keyboard, a mouse, a trackball, a voice recognition system, a camera, an optical scanner, or any other type of device capable of inputting information into the customization system. The customization system can display a user interface 110 on the screen 102. The user interface 110 can comprise menu options, images, navigation tools, or any other interactive or non-interactive item. A user can interact with the user interface 110 to navigate the customization system or select options by using the input device 104. The customization system can present the options as links, buttons, dropdown boxes, radio buttons, search boxes, horizontal or vertical arrows that scroll through options, or any other known or desired form of allowing a user to view and select an option which is received by the customization system. In some embodiments, images of the options can be displayed. In some embodiments, a caption or description of the option can be displayed.

The transmission mechanism 106 can be any wired or wireless transmission device, including a cellular data device (e.g., 3G/4G), a cellular voice device, a networking device, a fax device, a telephone device, or any other device capable of transmitting and receiving information.

In some embodiments the terminal 100 can further comprise a local storage system 112. The local storage system 112 can be a hard drive, flash memory, random access memory, or any other device capable of storing digital information. In alternate embodiments, the terminal can be configured to use the transmission mechanism 106 to communicate to an external storage system 114. The external storage system 114 can be a server, a networked hard drive, cloud storage, or any other device capable of storing digital information. The external storage system 114 can be permanently in communication with the terminal 100 via the transmission mechanism 106, or it can be in communication with the terminal 100 via the transmission mechanism 106 only when the customization system needs to save or load information. In some embodiments the customization system can be run as an application or program locally on the terminal 100. In alternate embodiments, the customization system can be run remotely from the external storage system 114. In other embodiments, some portions of the customization system can run be locally and other portions of customization system can run remotely. In some embodiments, the customization system can run through or run in conjunction with a web site. In some embodiments the customization system can be available through a search engine. In some embodiments the customization system can be available in multiple languages.

Figure 2:
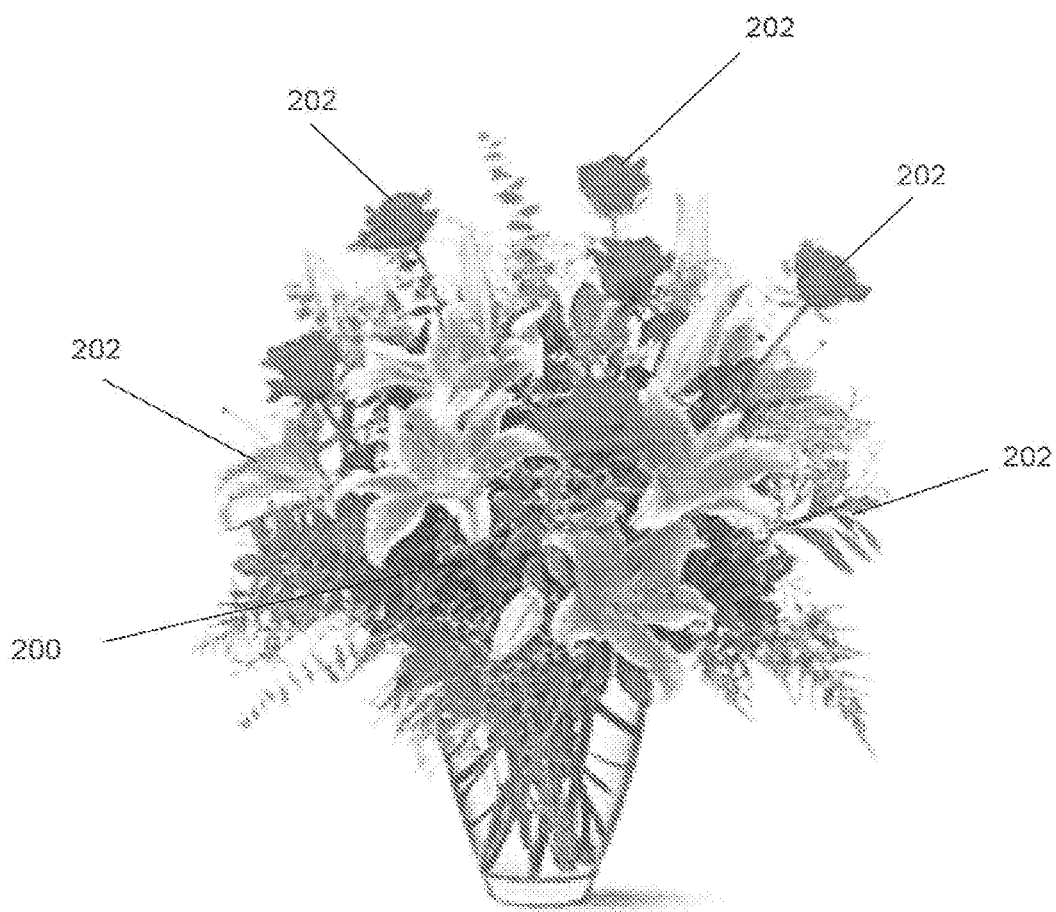
FIG. 2 depicts a floral arrangement comprising a plurality of stems.

FIG. 2 depicts a floral arrangement 200 comprising a plurality of stems 202. The stems 202 can be fresh flowers, dried flowers, silk flowers, imitation flowers, fresh plants, dried plants, imitation plants, straws, novelty straws, balloons, card holders, floral inserts, any other item desired to be part of a floral arrangement 200, any floral or floral-like element, or any mixture of stem types.

Figure 3:
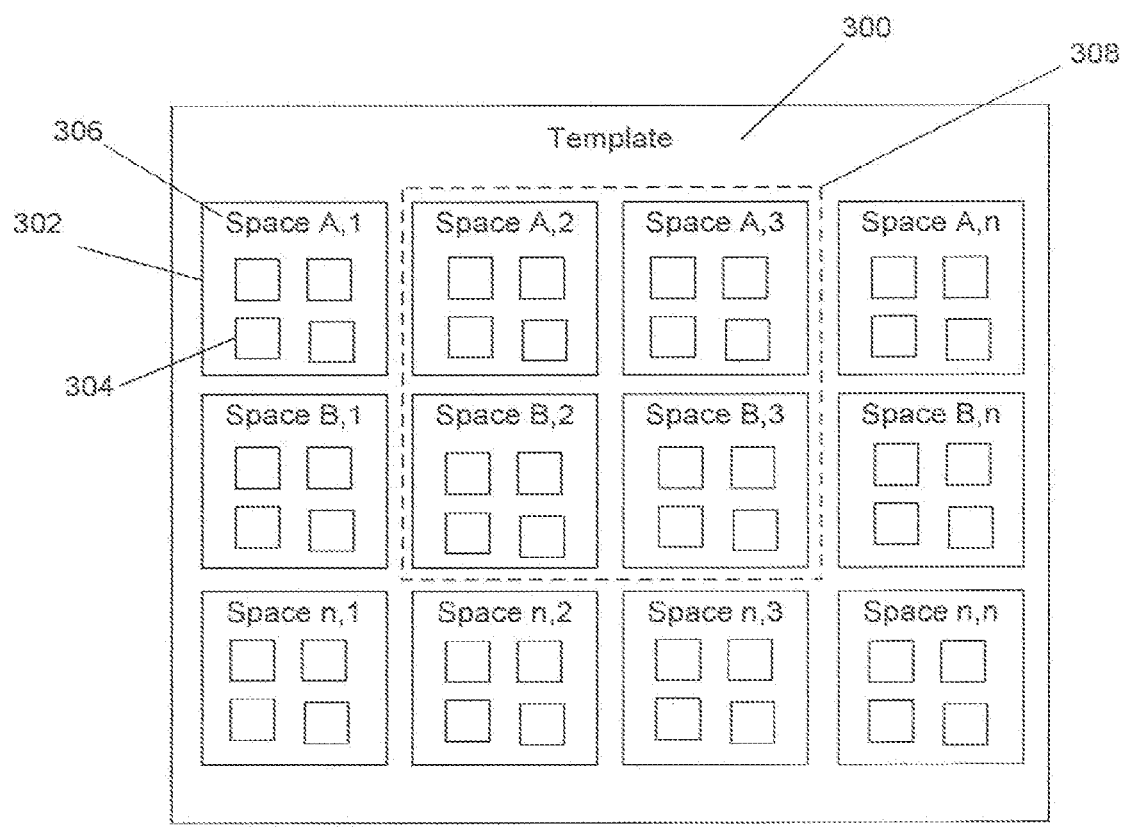
FIG. 3 depicts a virtual template used by the system to track the locations and attributes of each of the stems.

FIG. 3 depicts a tem plate 300 used by the customization system to track the locations and attributes of each of the stems 202. The tem plate 300 can be a virtual re presentation of a floral arrangement. Each floral arrangement is divided into multiple virtual individual components (or elements) or groups of components. E ach component can be selected, changed or modified by a user on a component by component basis and/or on a group of components by group of component basis. In an alternative embodiment, at least one or a plurality of component(s) can be selected and the remaining components randomly provided to the user by the customization system. In another alternative embodiment, at least one or a plurality of group(s) of components can be selected and the remaining groups of components are randomly provided to the user by the customization system. In another alternative embodiment, it could be any combination of at least one component or plurality of components selected by the user, at least one group of components or plurality of components are selected by the user, and the remaining components randomly provided by the customization system. In one embodiment, the template 300 can be a representation of a horizontal plane defined by the edges of the top of a vase. In other embodiments, the template 300 can be a representation of any other plane, box, sphere, or any other geometric shape through which stems 202 can pass when being placed into a floral arrangement 200. In other embodiments, stem insertion point configurations in the virtual template may be in a predetermined formation including at least one of a dartboard and pie-shaped wedges.

Figure 8:
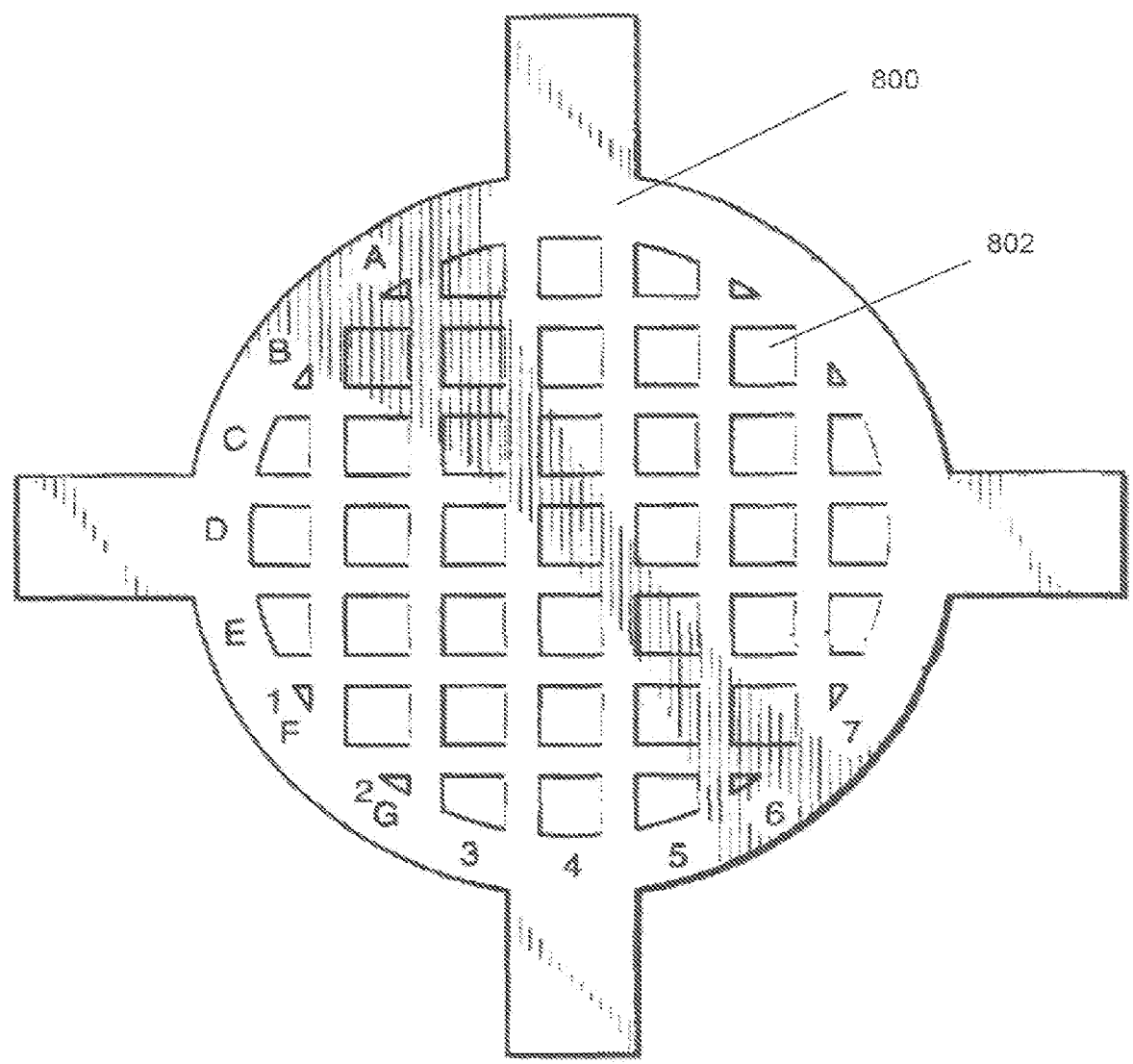
FIG. 8 depicts a physical template corresponding to a virtual template.
Figure 9:
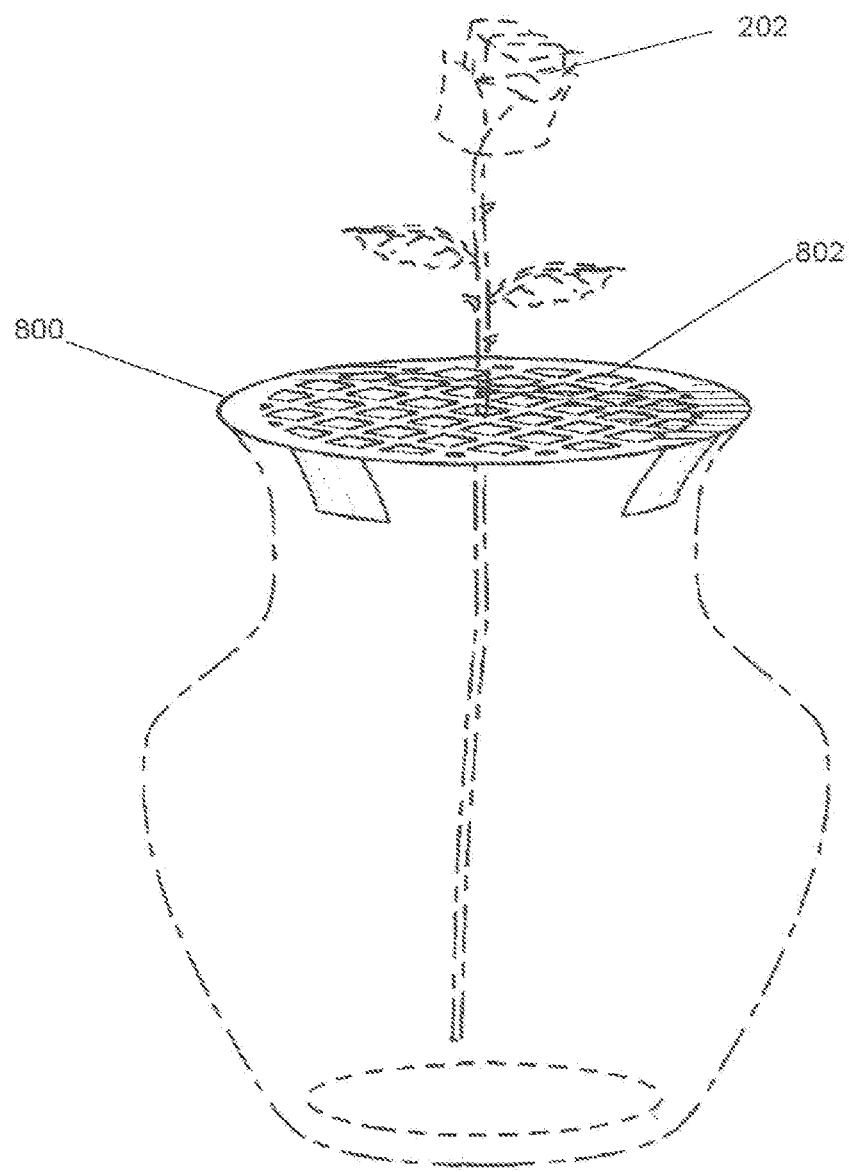
FIG. 9 depicts a physical template in use during assembly of a floral arrangement.

The template 300 can comprise one or more spaces 302. Each space 302 can be a virtual re presentation of a physical location where stems 202 can be placed within a physical floral arrangement 200. In some embodiments, a single stem 202 can be associated with each space 302. In some embodiments, more than one stem 202 can be associated with each space 302, up to a maximum number of stems 202 capable of fitting within the physical location. In some embodiments, the spaces 302 can be arranged in a grid configuration comprising rows and columns. In other embodiments, the spaces 302 can be arranged in geometric shapes such as concentric circles, swirls, patterns, or any other design. In another embodiment, the spaces 302 can be randomly arranged. In still other embodiments, a user can create new spaces 302 at any location on the template 300 that the user desires or can move existing spaces 302 to any other location that the user desires. In some embodiments the customization system can automatically or optionally adjust the relative distances between the spaces 302. As shown in FIGS. 8 and 9, the spaces 302 can correspond to locations 802 or apertures on a physical template 800 that can assist a person who is assembling a floral arrangement 200. In some embodiments, the physical template 800 can be the floral arranging aid described by Matteucci et al., U.S. Pat. No. 5,758,452, herein incorporated by reference. In other embodiments, the physical template 800 can be any other template with locations for stems that correspond to the spaces 302.

Each space 302 can be associated with one or more memory fields 304 on the local storage system 112 or the external storage system 114 capable of storing information about at least one characteristic of one or more stems 202. Each space can have a unique identifier 306. The unique identifier 306 can be a number, one or more letters, one or more characters, an alphanumeric code, a name, one or more coordinates, or any other type of data capable of uniquely identifying a space 302.

In some embodiments the customization system can display representations of the spaces 302 to the user as part of the user interface 110. In other embodiments, the customization system can hide the spaces 302 from the user. By way of a non-limiting example, the customization system can display images of the stems 202 as part of a user interface 110 and not display the associated underlying spaces 302. In still other embodiments, the customization system can allow a user to toggle between viewing and not viewing the spaces 302.

Spaces 302 can be linked together into groups 308. Groups 308 can consist of zero, one, or a plurality of spaces 302. By way of a non-limiting example, in one configuration the spaces 302 can be linked into types of groups such as a primary flower group, a secondary flower group, a complimentary flower group, a foliage group, and a novelty group. In some embodiments, each group 308 can comprise multiple preselected spaces 302. In some embodiments, the user can select which spaces 302 belong to which group 308 or modify existing or preconfigured groups 308. In some embodiments, the user can add or create customized groups 308 of spaces 302. In some embodiments in which the user can create groups 308, the user can give each group 308 a name or number. In some embodiments, the number of groups 308 can be fixed. In alternate embodiments there can be any number of groups 308. In some embodiments the user can select the number of groups 308. In some embodiments the number of groups 308 can be limited to a maximum number. In some embodiments, the maximum number of groups 308 can be the total number of spaces 302 within the template 300.

Figure 4:
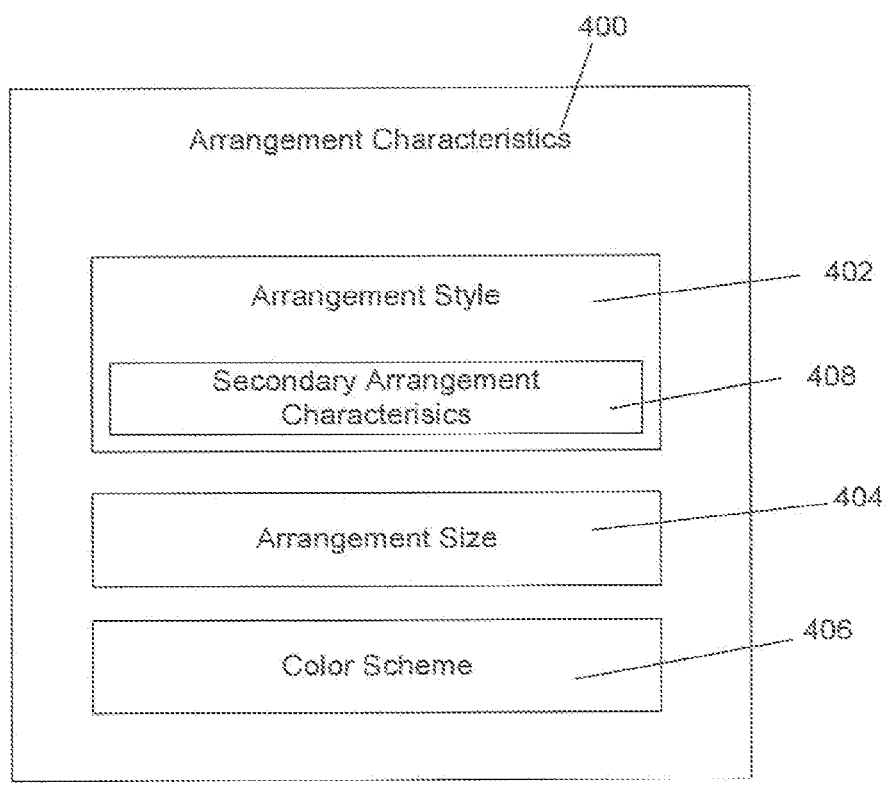
FIG. 4 depicts arrangement characteristics.

FIG. 4 depicts a plurality of arrangement characteristics 400. Arrangement characteristics 400 can be an arrangement style 402, an arrangement size 404, a color scheme 406, or any other characteristic that can describe a floral arrangement 200 as a whole. The arrangement style 402 can describe the overall shape of the floral arrangement 200, the layout of the floral arrangement 200, the orientation of the floral arrangement 200, and any other aspect of the floral arrangement 200. In some embodiments, the arrangement style 402 can be triadic, vase, spray, round, L-shaped, European, rose, fan, oval, bouquet, freeform, or any other known or desired style. In some embodiments, arrangement styles 402 that require vases, containers, supports, or other non-stem components can have one or more secondary arrangement characteristics 408. Secondary arrangement characteristics 408 can be the style, size, color, or other characteristic of the vase, container, support, or other non-stem component. Secondary arrangement characteristics may include a floral container, junction, bouquet holder, base, tray, box, base, sphere, polygon container, stuffed toy, lollipops, and novelty inserts (e.g., balloon straws). The arrangement size 404 can describe the height, width, depth, volume, or any other measurement of the floral arrangement 200. The arrangement size 404 can be preconfigured sizes labeled small, medium, and large, a custom size entered by a user, or any other size. The color scheme 406 can describe the colors to be used within the floral arrangement 200. Color schemes 406 can include preconfigured color palettes, monochromatic colors, complementary colors, custom colors entered by a user, all available colors, or any other color or selection of multiple colors or shades of colors. In some embodiments, the customization system can use the arrangement characteristics 400 to determine the shape and size of the template 300. In some embodiments, the customization system can use the arrangement characteristics 400 to determine the number and location of the spaces 302. In some embodiments, the owner or operator of the customization system can upload new selectable arrangement characteristics 400.

Figure 5:
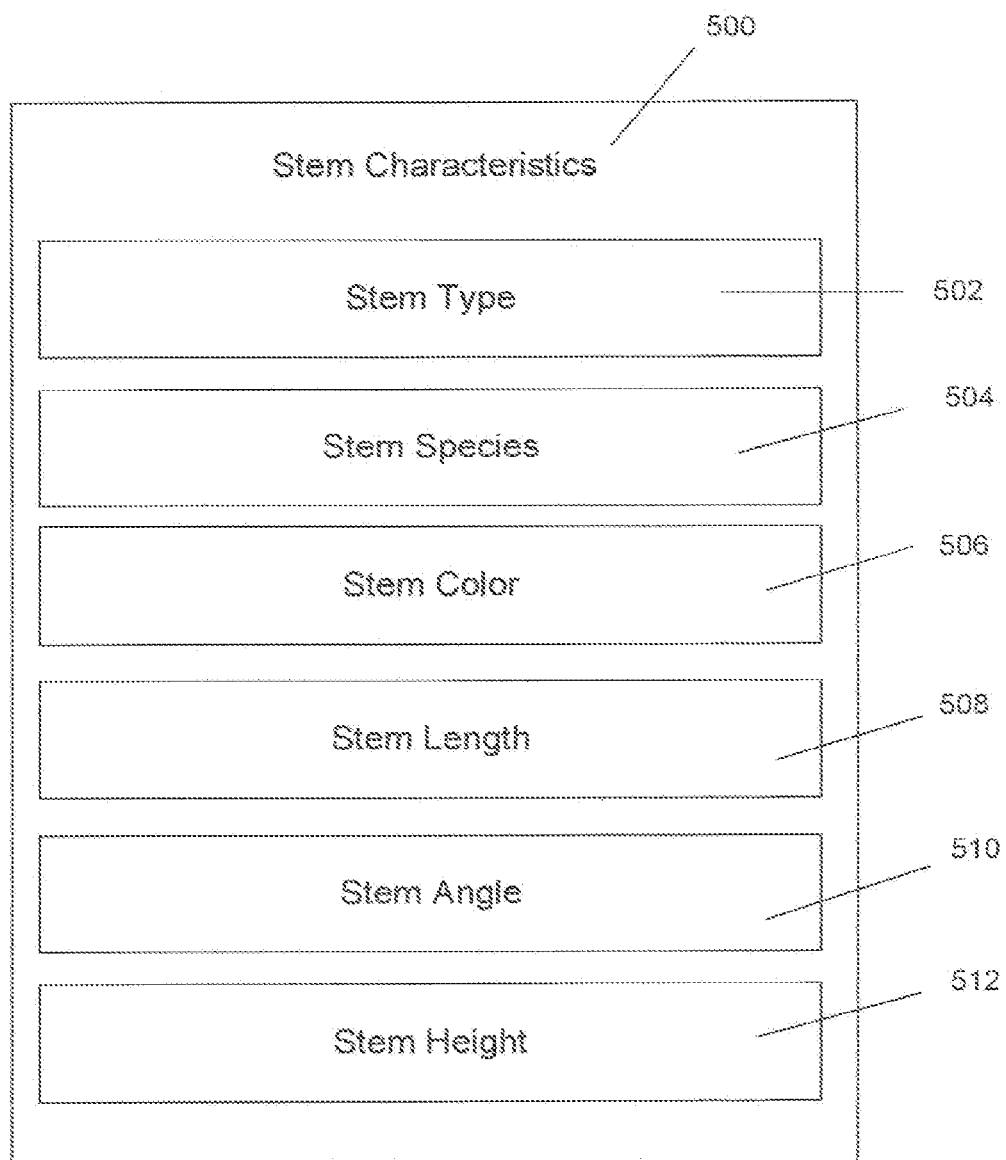
FIG. 5 depicts stem characteristics.

FIG. 5 depicts stem characteristics 500. The memory fields 304 associated with each space 302 can store one or more stem characteristics 500. Stem characteristics 500 can describe the one or more stems 202 associated with each space 302. Stem characteristics 500 can include stem type 502, stem species 504, stem color 506, stem length 508, stem angle 510, stem height 512, or any other known or desired characteristic of the one or more stem 202 at each space 302. In some embodiments, the owner or operator of the customization system can upload new selectable stem characteristics 500. The stem type 502 can be a fresh flower, a dried flower, a silk flower, an imitation flower, a fresh plant, a dried plant, an imitation plant, a floral-like item, a straw, a novelty straw, a balloon, a card holder, a floral insert, or any other item. The stem species 504 can be any species of flower or plant. The stem color 506 can be one or more colors that appear on the stem 202. The stem length 508 can be the length of the stem 202 from its bottom to its top. The stem angle 510 can be an angle of the stem 202 relative to the template 300, an angle of the stem 202 relative to a fixed plane, an angle of any portion of the stem 202 relative to a fixed plane, or any other angle. The stem height 512 can be the distance from the bottom of the floral arrangement 200 to the bottom of the stem 202, the distance from the bottom of the floral arrangement 200 to the top of the stem 202, or any other height.

Figure 6:
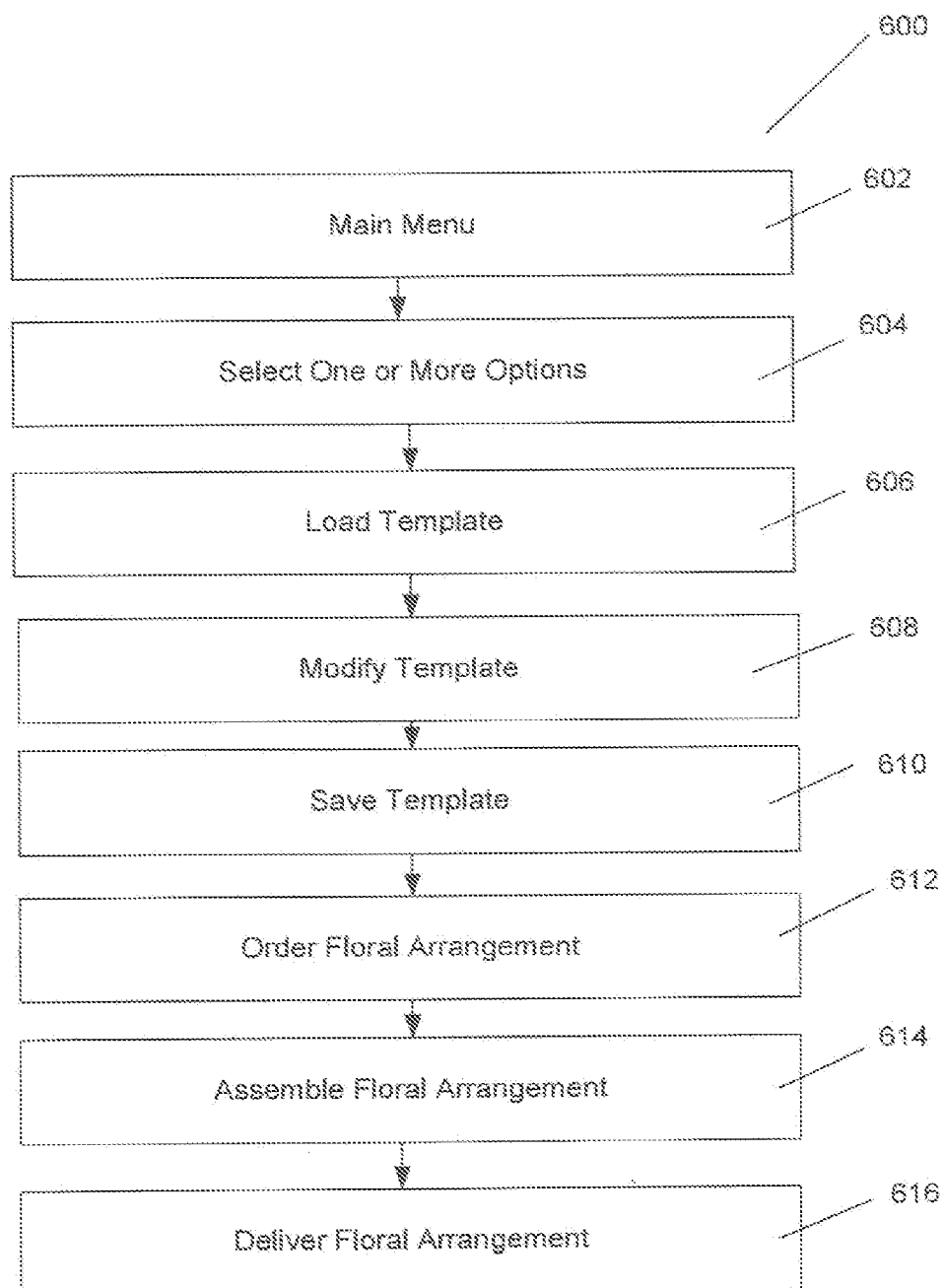
FIG. 6 depicts a flow chart of the customization system.
Figure 7:
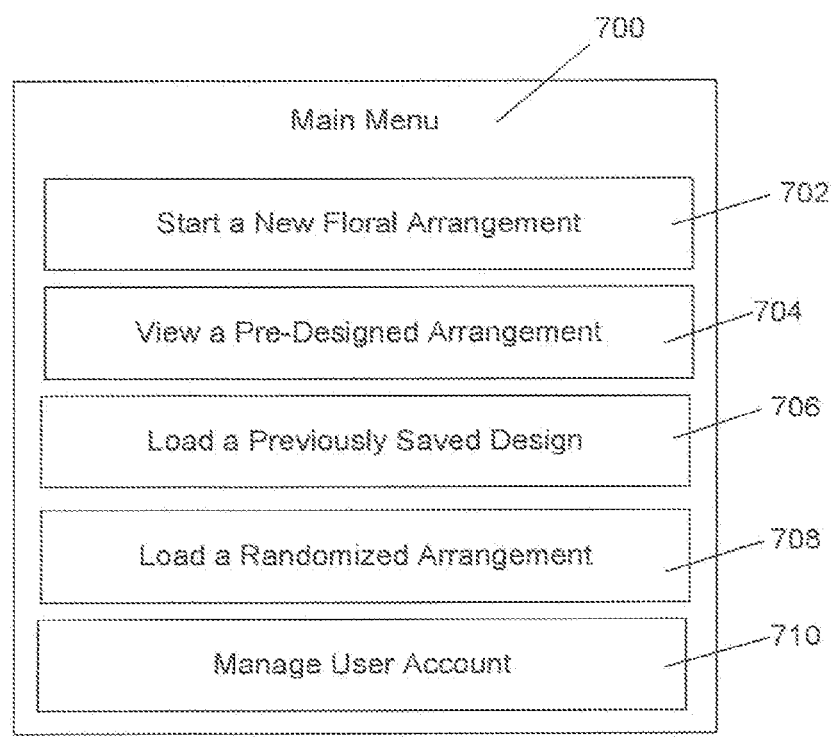
FIG. 7 depicts options displayed on the main menu.

FIG. 6 depicts a flow chart 600 of the customization system. At 602, the customization system can display a main menu 700 comprising one or more options as shown in FIG. 7. At 604, a user can select one or more of the options by using the input device 104 and whereupon the selection is received by the customization system. At 606, the customization system can load a template 300 according to the selected option. At 608, the user can modify the template 300. At 610, the user can save the template 300. At 612, the user can order the customized floral arrangement 200. At 614, the order fulfiller can assemble the floral arrangement 200. At 616, the order fulfiller can deliver the floral arrangement 200 to the user.

FIG. 7 depicts the main menu 700 displayed by the customization system at 602. The options displayed on the main menu 700 can include one or more of the following: starting a new floral arrangement 702, viewing a predesigned arrangement 704, loading a previously saved design 706, loading a randomized arrangement 708, managing the user's account 710, or any other known or desired function.

When the user selects 604 to start a new floral arrangement 702, the customization system can display a menu with options based on the arrangement characteristics 400. The user can select 604 the arrangement characteristics 400 and any applicable secondary arrangement characteristics 408. The customization system can load a template 300 suitable for the selected arrangement characteristics 400. In some embodiments, the customization system can load the spaces 302 with preconfigured default stems 202 that have preconfigured default stem characteristics 500. In alternate embodiments, the customization system can leave the spaces 302 empty. In some embodiments, the customization system can present the user with an option to load the spaces 302 with stems 202 having randomized stem characteristics 500. In some embodiments, the customization system can guide the user step by step through the selection of the arrangement characteristics 400 by presenting suggestions or tips. The customization system contains governing protocols which are rules that allow the user to work within a framework as a guide. Such rules help decide appropriate color scheme, style, stem height, shape, balance, symmetry, or asymmetry. The customization system provides these governing protocols to the user so as to aesthetically control the options offered in accordance with core design principles. In some embodiments, the suggestions or tips can be suggested arrangement characteristics 400 for a particular situation or occasion, popular or complimentary color schemes 406, or any other information that can be helpful for a user. The customization system also monitors the received selections of the componentized arrangement characteristics, stem characteristics and non-stem item selections and adjusts inventory management based on the received selections. The governing protocols may also be adjusted based on available inventory either at a central location, distributed warehouse locations and/or local floral stores and will provide guidance to the user accordingly. The customization system also monitors the user selections so as to easily repeat components or groups of components selected by the user.

When the user selects 604 the option to view a pre-designed arrangement 704, the customization system can display a menu with options that allow the user to view and select all arrangements, new arrangements, popular arrangements, arrangements incorporating specific flowers arrangements sorted based on the arrangement characteristics, arrangements designed for specific occasions, or any other desired category. In some embodiments, certain options can have one or more sub-options that can allow the user to sort or view further options within a particular category. In some embodiments, the customization system can allow the user to search for arrangements. In some embodiments that allow the user to view or search pre-designed arrangements according to occasion, the occasions can include weddings, birthdays, anniversaries, funerals, graduations, holidays, seasons, every day, or any other known or desired occasion. In some embodiments the customization system can display information that can assist the user in selecting an occasion or an arrangement, such as the date, the time, upcoming holidays, upcoming birthdays saved in a user's account, the current season, or any other information. In some embodiments, the customization system can present predesigned arrangements suitable for a person with a specific personality. In some embodiments, the customization system can present predesigned arrangements with particular meanings.

In some embodiments in which the user selects a wedding occasion, the customization system can display one or more additional features related to planning a wedding. The additional features can include a reference image, venue and décor planning tools, or any other wedding planning feature. The reference image can be an image of a wedding item or packages of wedding items, including a wedding dress, gown, shoes, groom and groomsman attire, flower girl dresses, jewelry, cake, or any other item used in a wedding. The reference image can be displayed such that a user can compare the colors in the reference image to the colors in the floral arrangement 200, or for any other reason. The reference images can be preloaded into the customization system, downloaded from a server, transmitted to the customization system from a camera or cell phone, or loaded in any other manner. The venue and décor planning tools can allow the user to select and modify a ceremony and/or reception venue, including customizing attributes such as the color, shape, size, type, and location of seats, pews, tables, candles, columns, venue location, background, or any other element of wedding décor. The customization system can display a digital rendering of the selected venue and the selected wedding décor elements, and can display an image of the selected floral arrangement 200 on each table or at any other location within the digital rendering of the venue.

In some embodiments, predesigned arrangements can include floral arrangements 200 designed by florists or wire companies. In some embodiments, florists and wire companies can use the customization system to translate their designs as templates 300, arrangement characteristics 400, and stem characteristics 500, and can upload their designs to the customization system as predesigned arrangements capable of being selected by a user. The owner or operator of the customization system can similarly upload new or existing designs to the customization system as predesigned arrangements. In some embodiments, a user can select an uploaded predesigned arrangement corresponding to a florist or wire company design by entering a product or item number, or scanning a bar code associated with the design. In some embodiments, a user can scan or take a picture of a printed image of a floral arrangement 200 and load that design into the customization system.

When a user selects 604 the option to load a previously saved design 706, in some embodiments the customization system can display a menu that lists all previously saved designs associated with the user's account. In alternate embodiments the customization system can automatically load the most recently saved design associated with the user's account. When the user selects 604 a previously saved design, the customization system can load 606 the saved template 300 and stems 202 from a local storage system 112 or an external storage system 114.

When a user selects 604 the option to load a randomized arrangement 708, the customization system can load 606 a template 300 based on randomized arrangement characteristics 400 and load the spaces 302 with stems 202 having randomized stem characteristics 500. In some embodiments, the user can choose to select some arrangement characteristics 400 and/or stem characteristics 500 and have the customization system randomize the rest. In alternate embodiments where the customization system has presented a randomized arrangement, the user can choose to lock one or more arrangement characteristics 400 and/or stem characteristics 500 and have the customization system randomize the other arrangement characteristics 400 and/or stem characteristics 500 that remain unlocked.

When a user selects the option to manage a user account 710, the customization system can load a menu with options for signing in, logging out, entering payment information, entering contact information, or any other information for managing an account. In some embodiments, the user can save dates for birthdays, anniversaries, or other occasions that the user wishes to remember. In some embodiments, the customization system can remind the user about upcoming or current dates. In some embodiments, the user can view the user's order history.

At 606, the customization system can load the template according to the options selected at 604. The customization system can display an image of the floral arrangement 200 according to the currently selected arrangement characteristics 400 and stem characteristics 500. In some embodiments, the image can be comprised of layered static images of each stem 202 and any other selected elements. In alternate embodiments, the image can be comprised of a two dimensional or three dimensional digital rendering of the floral arrangement 200. In some embodiments the customization system can allow the user to spin or rotate the image to view the floral arrangement 200 from any or all angles. In some embodiments, the customization system can display a list of all currently selected arrangement characteristics 400 and stem characteristics 500.

At 608, the customization system can allow the user to modify any or all of the arrangement characteristics 400 or stem characteristics 500. In some embodiments, the user can select one or more of the spaces 302 and modify the stem characteristics 500 of the one or more stems 202 located at the selected one or more space(s) 302. The user can select one of the arrangement characteristics 400 or stem characteristics 500 and the customization system can display a list of options and/or sub-options reflecting possible modifications within the selected arrangement characteristic 400 or stem characteristic 500 category for the user to select. The customization system can keep the unmodified arrangement characteristics 400 or stem characteristics 500 unchanged. By way of a non-limiting example, a user can select the stem species 504 stem characteristic 500 and be presented with a list of species the user can choose to have at the selected one or more space(s) 302. In alternate embodiments in which the spaces 302 are assigned to groups 308, the customization system can allow the user to modify all stems 202 at each of the spaces 302 within a group 308 at once. By way of a non-limiting example, a user can select a primary flower group and modify the stem color 506 stem characteristic 500 of all the stems 202 at the spaces 302 associated with the primary flower group from red to yellow. In some embodiments, the customization system can indicate which spaces 302 or group 308 are selected by highlighting or otherwise drawing attention to images of the selected stems 202, images of the selected spaces 302, all images of the stems 202 or spaces 302 associated with the selected group 308, or any buttons or other user interface elements associated with the selected stems 202, spaces 302 or groups 306.

In some embodiments, the customization system can guide the user step by step through the modification of the stem characteristics 500 by presenting suggestions or tips. In some embodiments, the suggestions or tips can be suggested stem characteristics 500 for a particular situation or occasion, popular or complimentary stem colors 506 or stem species 504, or any other information that can be helpful for a user. In some embodiments, the customization system can present suggested stem characteristics 500 suitable for a person with a specific personality. In some embodiments, the customization system can present suggested stem characteristics 500 with particular meanings.

In some embodiments, certain arrangement characteristics 400 can be incompatible with certain stem characteristics 500. The customization system can be configured to only present modification options to the user that are compatible with the selected arrangement characteristics 400. By way of a non-limiting example, a "calla lilly" stem species 504 can be incompatible with a "round" arrangement style 502, and the customization system will not display a stem species 504 option for the calla lilly species for a template 300 that has a "round" arrangement style 502. Similarly, by way of another non-limiting example, a "red" stem color 506 can be incompatible with a color scheme 406 comprising shades of blue and white, and the customization system will not display stem color 506 options with shades of red for a template 300 that has a "blue and white" color scheme 406. In alternate embodiments, all stem characteristics 500 can be displayed as options regardless of their compatibility with the arrangement characteristics 400, unless the stem characteristics 500 would result in a physical floral arrangement that could not be physically assembled due to stem, size, style, or species limitations. In some embodiments, the customization system can be configured to not present certain stem characteristics 500 as options if they, relative to other selected stem characteristics 500, would violate preconfigured aesthetic limitations or principals of floral design.

In some embodiments, the customization system may need to change the shape or size of the template 300 to fit modified arrangement characteristics 400 such as the arrangement style 402 or arrangement size 404 if the user modifies one or more of those arrangement characteristics 400. A template 300 that has a different shape or size can have a different number and different locations of spaces 302. In some embodiments, the customization system can translate the stem characteristics 500 of one or more spaces 302 to the spaces 302 of the new template 300 by reducing the number of spaces 302, changing the locations of the spaces 302, or any other necessary modification. By way of a non-limiting example, the customization system can reduce the number of spaces 302 associated with a primary flower group from ten spaces to eight spaces if the user decides to select an arrangement style 402 or arrangement shape 404 that has a smaller vase and a smaller associated template 300. In other embodiments, the customization system can display an error message if the stem characteristics 500 will not work with a different template 300. In still other embodiments, the customization system can only display as options the arrangement styles 402 or arrangement sizes 404 that have associated templates 300 that are compatible with the currently selected stem characteristics 500.

In some embodiments, an updated image of the floral arrangement 200 and/or list of selected arrangement characteristics 400 and stem characteristics 500 can be displayed as part of the user interface 110 after each modification is made to the arrangement characteristics 400 or the stem attributes 500. In alternate embodiments, an updated image of the floral arrangement 200 and/or list of selected arrangement characteristics 400 and stem characteristics 500 can be displayed after the arrangement is saved at 610.

In some embodiments, the customization system can automatically adjust stem characteristics 500 such as the stem heights 512 or stem angles 510 to optimally position or orient the stems 202 to match the arrangement style 400 or the arrangement size 500. By way of a non-limiting example, in some embodiments the customization system can automatically adjust the stem height 512 of each stem 202 in the template 300 so that the overall shape of the floral arrangement 200 matches a preconfigured shape for the arrangement style 402. In alternate embodiments, the customization system can present an option to the user to automatically adjust the stem characteristics 500 for optimal positioning or orientation of the stems 202. In some embodiments the customization system can adjust the relative distances between the stems 202 to be equal, within a specified range, random, or any other distance.

At 610, the user can choose to save the current state of the template 300. Information about the template 300 can be stored on the local storage system 112 or on the external storage system 114. In some embodiments, the state of the template 300 can be saved to the local storage system 112 or the external storage system 114 after each modification is made to the arrangement at 608. In some embodiments, the customization system can allow only the latest state of the template 300 to be saved. In other embodiments the customization system can allow the user to save a library of templates 300. In some embodiments, the user can enter a name for the saved template 300. In some embodiments, the customization system can allow the user to delete saved templates 300. In some embodiments, the customization system can delete saved templates 300 associated with a user's account after a period of time, when the saved templates reach a size limit on the local storage system 112 or external storage system 114 or for any other reason. In embodiments in which the customization system deletes saved templates 300 associated with a user account, the customization system can choose to delete the oldest saved template 300, the saved template 300 used the least frequently, templates 300 not marked as favorites, or any other template 300 according to any criteria.

In some embodiments, the customization system can send a saved template 300 or a picture of the floral arrangement 200 described by a saved template 300 via email or text, upload it to a social network or web site, or send it via any other method selected by a user. In some embodiments, the user can share a saved template 300 or a picture of the floral arrangement 200 described by a saved template 300 with another a user who is operating the customization system on a different terminal 100. In some embodiments, the terminal 100 can share information with other nearby terminals 100 that are on the same or different networks, or that are linked through a temporary data connection between the terminals 100 created using each terminal's transmission mechanism 106.

At 612, the user can choose to order the floral arrangement 200 described by the saved template 300. In some embodiments, the user can also order accessories to be included with the floral arrangement 200, such as cards, personalized cards, balloons, stuffed animals, or any other desired item. The customization system can display a checkout option that can allow the user to pay for the floral arrangement 200, and any applicable taxes, shipping costs, and other fees, and select an address to which the floral arrangement 200 will be shipped or delivered. In some embodiments, the user can indicate that the user desires to pick up the floral arrangement 200 at a store. The customization system can transmit a specification to an order fulfiller via the transmission mechanism 106. The specification can comprise the saved template 300, the selected arrangement characteristics 400, the selected stem characteristics 500, the order information, and any other associated data, code, or assembly criteria.

The order fulfiller can be a florist, vendor, or any other person able to assemble floral arrangements 200. The order fulfiller can be located at an order fulfillment center, at a florist shop, or at any other location. The specification can be transmitted to an order fulfiller designated by the customization system, an order fulfiller designated by the owner or operator of the customization system, an order fulfiller closest to the customer, an order fulfiller who can assemble the floral arrangement at the least expense, an order fulfiller selected by the user, or any other order fulfiller. In some embodiments, the customization system can present a menu to the user in which the user can view or search order fulfillers by categories that can include distance from the user, user ratings, fulfillment time, performance ratings, or any other category. In still other embodiments, the order information can be posted on a central server that is accessible to order fulfillers, such that the order fulfillers can elect to fulfill orders based on their inventory on hand, or place auction bids to fulfill specific orders. In some embodiments, the user can select the winning auction bid.

At 614, the order fulfiller can assemble the arrangement by exactly following the information in the transmitted specification. In some embodiments, the order fulfiller can view the specification on a screen. In other embodiments, the specification can be printed. As shown in FIGS. 8 and 9, the order fulfiller can use the physical template 800 that matches the template 300 created by the customization system. The physical template 800 can comprise physical locations 802 that correspond to each space 302. The order fulfiller can place a physical stem 202 that matches the stem characteristics 500 associated with each space 302 at each physical location 802 corresponding to the space 302.

At 616, the order fulfiller can ship or deliver the assembled floral arrangement 200 to the location specified by the user, or the order fulfiller can notify the user that the floral arrangement 200 is ready to be picked up at a store.

In some embodiments, the customization system can keep statistics on arrangement characteristics 400 and/or stem characteristics 500 that have been used or ordered. The statistics can allow the customization system to identify popular arrangement designs and/or frequently used arrangement characteristics 400 and/or stem characteristics 500. The statistics can assist a florist or the order fulfiller in tracking popular stems 202, vases, or other supplies and allow the florist or order fulfiller to anticipate inventory needs. In some embodiments, statistics can be kept about each user, such that the customization system can present the user with the user's most commonly used arrangement characteristics 400 and/or stem characteristics 500, or suggest similar or complimentary arrangement characteristics 400 and/or stem characteristics 500.

Figure 10:
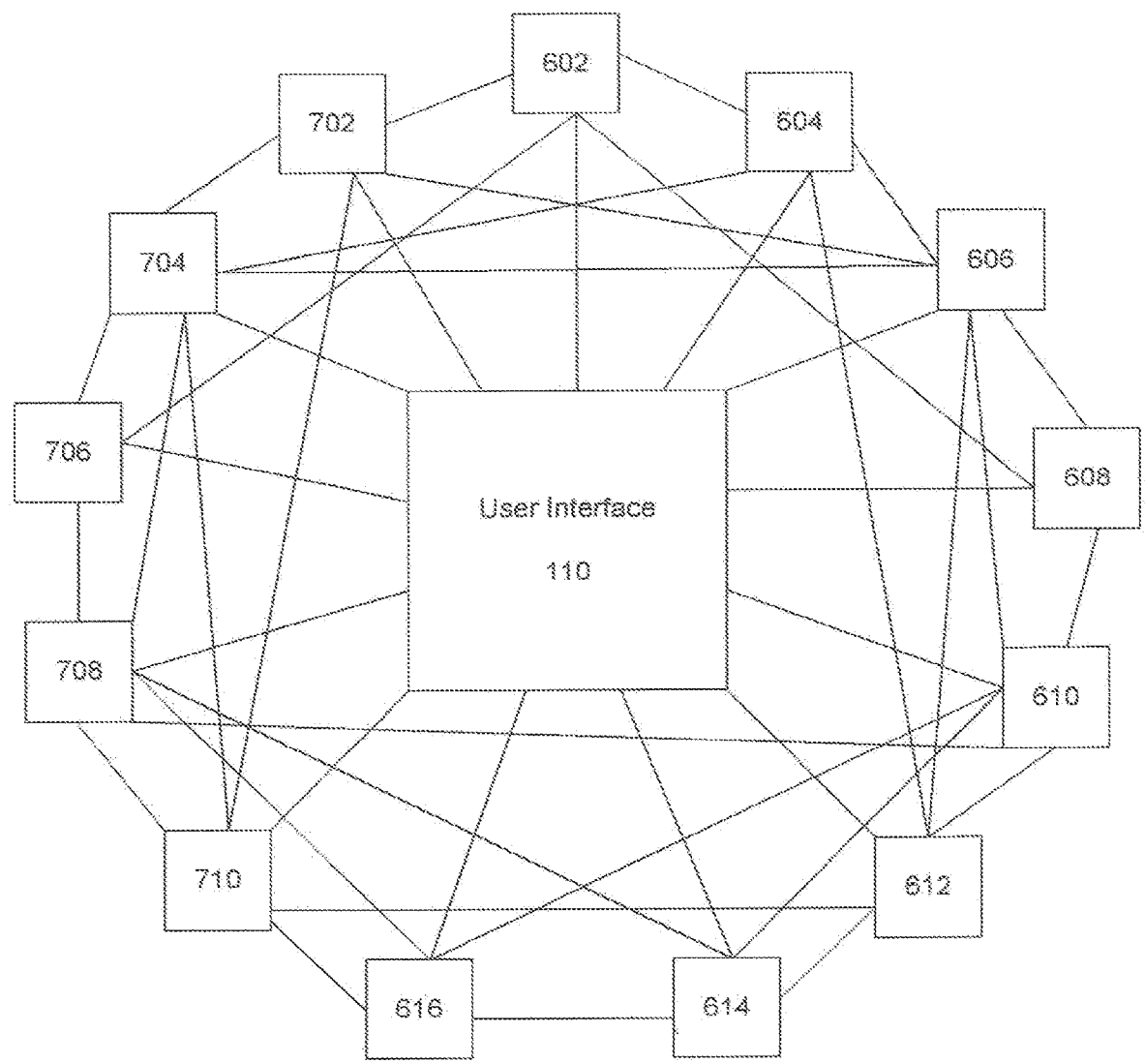
FIG. 10 depicts a diagram showing that the steps of the system can be performed in any order.

As shown by FIG. 10, the user can access any of the steps and options described above in any order through the user interface 110. The user chooses an "entry point" of the steps and options listed above to begin the process of creating the customized floral arrangement. The user interface 110 can access or display any of the steps or options at any time, and can navigate to any step or option from any other step or option. By way of a non-limiting example, a user can use the user interface 110 to modify a template at step 608 and then choose to navigate to step 706 to load a previously saved design.

Figure 11:
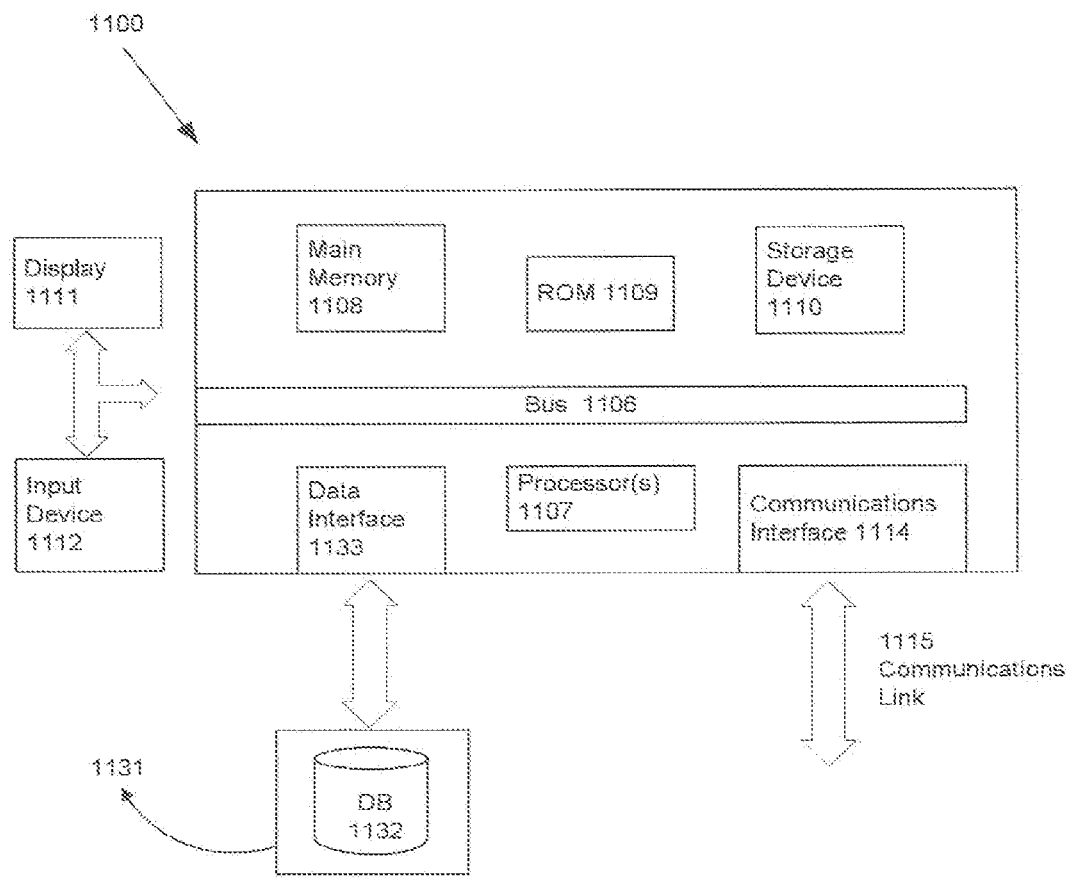
FIG. 11 depicts a computer system capable of running the customization system.

The execution of the sequences of instructions required to practice the embodiments may be performed by a computer system 1100 as shown in FIG. 11. In one embodiment, execution of the sequences of instructions is performed by a single computer system 1100. According to other embodiments, two or more computer systems 1100 coupled by a communication link 1115 may perform the sequence of instructions in coordination with one another. Although a description of only one computer system 1100 will be presented below, however, it should be understood that any number of computer systems 1100 may be employed to practice the embodiments.

A computer system 1100 which operates the customization system according to at least one embodiment will now be described with reference to FIG. 11, which is a block diagram of the functional components of the computer system 1100. As used herein, the term computer system 1100 is broadly used to describe any computing device that can store and independently run one or more programs. For example, the computer system which implements the customization system may be a specialized server (e.g., hardware or hardware/software) having a hierarchical database.

Each computer system 1100 may include a communication interface 1114 coupled to the bus 1106. The communication interface 1114 provides two-way communication between computer systems 1100. The communication interface 1114 of a respective computer system 1100 transmits and receives electrical, electromagnetic or optical signals, that include data streams representing various types of signal information, e.g., instructions, messages and data. A communication link 1115 links one computer system 1100 with another compute system 1100. For example, the communication link 1115 may be a LAN, in which case the communication interface 1114 may be a LAN card, or the communication link 1115 may be a PSTN, in which case the communication interface 1114 may be an integrated services digital network (ISDN) card or a modem, or the communication link 1115 may be the Internet, in which case the communication interface 1114 may be a dial-up, cable or wireless modem.

A computer system 1100 may transmit and receive messages, data, and instructions, including program, i.e., application, code, through its respective communication link 1115 and communication interface 1114. Received program code may be executed by the respective processor(s) 1107 as it is received, and/or stored in the storage device 1110, or other associated non-volatile media, for later execution.

In an embodiment, the computer system 1100 operates in conjunction with a data storage system 1131, e.g., a data storage system 1131 that contains a database 1132 that is readily accessible by the computer system 1100. The computer system 1100 communicates with the data storage system 1131 through a data interface 1133. A data interface 1133, which is coupled to the bus 1106, transmits and receives electrical, electromagnetic or optical signals (including non-transitory signals), that include data streams representing various types of signal information, e.g., instructions, messages and data. In embodiments, the functions of the data interface 1133 may be performed by the communication interface 1114.

Computer system 1100 includes a bus 1106 or other communication mechanism for communicating instructions, messages and data, collectively, information, and one or more processors 1107 coupled with the bus 1106 for processing information. Computer system 1100 also includes a main memory 1108, such as a random access memory (RAM) or other dynamic storage device, coupled to the bus 1106 for storing dynamic data and instructions to be execute by the processor(s) 1107. The main memory 1108 also may be used for storing temporary data, i.e., variables, or other intermediate information during execution of instructions by the processor(s) 1107.

The computer system 1100 may further include a read only memory (ROM) 1109 or other static storage device coupled to the bus 1106 for storing static data and instructions for the processor(s) 1107. A storage device 1110, such as a magnetic disk or optical disk, may also be provided and coupled to the bus 1106 for storing data and instructions for the processor(s) 1107.

A computer system 1100 may be coupled via the bus 1106 to a display device 1111, such as, but not limited to, a cathode ray tube (CRT), for displaying information to a user. An input device 1112, e.g., alphanumeric and other keys, is coupled to the bus 1106 for communicating information and command selections to the processor(s) 1107.

According to one embodiment, an individual computer system 1100 performs specific operations by their respective processor(s) 1107 executing one or more sequences of one or more instructions contained in the main memory 1108. Such instructions may be read into the main memory 1108 from another computer-usable medium, such as the ROM 1109 or the storage device 1110. Execution of the sequences of instructions contained in the main memory 1108 causes the processor(s) 1107 to perform the processes described herein. In alternative embodiments, hard-wired circuitry may be used in place of or in combination with software instructions. Thus, embodiments are not limited to any specific combination of hardware circuitry and/or software. In alternative, multiple processors may be located at different locations and networked together (e.g., through the Internet) which collectively implement the customization system described throughout this disclosure.

The term "computer-usable medium," as used herein, refers to any non-transitory medium that provides information or is usable by the processor(s) 1107. Such a medium may take many forms, including, but not limited to, non-volatile, volatile and transmission media. Non-volatile media, i.e., media that can retain information in the absence of power, includes the ROM 1109, CD ROM, magnetic tape, and magnetic discs. Volatile media, i.e., media that cannot retain information in the absence of power, includes the main memory 1108. Transmission media includes coaxial cables, copper wire and fiber optics, including the wires that comprise the bus 1106. Transmission media can also take the form of non-transitory carrier waves; i.e., electromagnetic waves that can be modulated, as in frequency, amplitude or phase, to transmit non-transitory information signals. Additionally, transmission media can take the form of acoustic or light waves, such as those generated during radio wave and infrared data communications.

An aspect of the disclosure described herein is a method and system for fragmenting identifiable parts of a total artistic composition, wherein said parts fit or are arranged in a specific repeatable manner to create any specific repeatable composition. In another aspect of the disclosure includes a method and system for arranging and customizing flowers or "floral-like" stems in a precise and repeatable fashion. Flowers and/or floral like stems can be fresh cut flowers, silk or dried flowers, paper, plastic or tissue flowers, decorative flowers, or edible flower shaped food stems. Another aspect of the disclosure is a system and method for customizing or selecting each individual element of a total floral arrangement composition within a pre-constructed framework or diagram model. Each "element" of a floral arrangement may be an identifiable unique fragmented component of a total sum of components that when combined, can create a harmonious and organized composition. Furthermore, this organization can be constructed to demonstrate a cohesive and attractive floral composition using certain principles of floral design, and then repeated by anyone with any skill level. Customizable floral elements can include: vases, floral containers, flowers or "floral-like stems," bouquets, centerpieces, altar arrangements, boutonnieres, decorative stems, vase inserts, etc. Customizable floral elements may further include: styles and sizes of total arrangements or bouquets or centerpieces; as well as quantity, positions, lengths, groupings, angles, species and colors of flowers, including their relative and complementary color schemes "design-rule" deliberate grouping of flowers.

In another aspect of the disclosure is a system and method for designating, identifying and then separating or fragmenting each and every individual element of any entire flora composition according to standard and reasonable design rule principles of floral design—professional and otherwise. Allowing the user of our system or method to select, change or interchange any number of available selectable options within each flora element group. Floral elements may be updated, loaded, removed according their actual availability on the backend; to complement specific compositions, styles, color schemes, sizes, occasions, theme, or within a temporary or pre-programmed/pre-constructed design rule.

In another aspect of the disclosure is a system or method of customizing floral arrangements within pre-designated (or predetermined) floral frameworks or diagram models. Floral "frameworks" act as a pre-set model, pattern or the established "skeleton" of any floral arrangement, bouquet, or centerpiece wherein each and every individual floral component can be manipulated. Floral components may be reduced or increased in quantity. Floral components can be selected by: size, color, length, grouping, angle, species or type of floral item or floral-like items, containers, etc. all within a pre-set framework or diagram model. Floral components can be searched or identified by a single desired element, or favorite species of flower, or birth flower or by the meaning of a flower, mood or behavior of the user or searched by the specific color or color scheme of a flower. Floral components can be selected, compared to or established by color matching a "color swatch" from any actual, computer, mobile or photographed image or image carrying device or color sample—either taken with a camera phone for instance or by a native or web based image or file then matching any floral stems, or any arrangement, styles, occasion, color, or floral compositions, etc. Floral or floral arrangements shall refer to any composition or deliberate organization of floral or floral-like elements. Floral frameworks can be manipulated or pre-programmed with any variable parts, number of parts, positions, angles or diameter of vase/floral, etc. but each part is typically repeated to create the same outcome of total parts "composition" once it is pre-set or pre-programmed like a template or model. Users may customize and or personalize any/all specific individual parts of any floral composition with a virtual template; then the actual floral composition order can followed using an actual template or otherwise. It is beneficial to use the actual coded adhesive prior invention (vase or floral container grid) in conjunction with the customization system but not necessary. The actual coded adhesive prior invention enhances and facilitates the means of progressing and advancing the translation of customized virtual template floral elements and a user's "customized floral recipe" into an actual floral template arrangement composition for order fulfillment, but is not limited nor restricted to the use of the prior actual coded adhesive vase grid. A user customizes none or several floral components within the method or system disclosed herein, and a specification list is compiled on the back end of the customization system for the order fulfiller to accurately follow precise floral elements of that personalized floral order including: vase/floral container, arrangement type, stem count, species of flowers, size, color, shape of arrangement, color scheme or style; floral stem species, flora types of inserts, quantity of flora stems, size and style of arrangements, length, position of flora elements inserted into the vase whether virtual and actual template or just virtual. Floral groupings within the customization system can be broken down and possibly identified by Main Flowers, Secondary Flowers, Complementary Flowers, Foliage, etc for example, to distinguish importance sizing, appropriate grouping of flowers or stems; and be able to identify each floral component, its size, species, length and specific location within the arrangement and vase or floral container. Whether the user of the customization system elects to change various components of an arrangement, modify them, create from scratch or purchases any one of a number of already predesigned floral arrangements without making any changes, it is important to note that all floral arrangements within the customization system or method or software are designed and/or customized over an established platform or (virtual, and is some cases accompanying actual template) that designates and identifies specific entry points of stems or floral components as pre-designed angle or line segment diagrams, in order to hold designated position(s).

In another embodiment, a bride-to-be may elect to design or order a specific floral composition from the customization system, then share on social media, save, order or view that arrangement in any number of multiple quantities in a three-dimensional (3D) virtual scene perspective of her potential future wedding ceremony or reception with selectable backdrops, rooms, environments, tables, chairs, table setting, guest seating, etc. The same is true for any user of the customization system. A bride-to-be may select the "meaning of a certain flower", her "birth flower", or a favorite flower or start out with a specific color of her desired wedding flowers, and start building or designing her arrangement using any of the above criteria. A bride-to-be may scan, download or take or use an image, file, photograph or download. The same is true for any floral user, system user or customer. The bride may scan a picture of a color swatch, her shoes, bridesmaids dresses, jewelry, or any article to color match her flowers. She may also use the customization system's virtual color wheel, to research and observe different color schemes: monochromatic, complementary, triadic color schemes, etc. The same is true for any floral user, system user or customer.

Groups of individual components may be individually organized on a user experience (UX) screen to possibly have selectable thumbnail or separate image categories for each floral group of floral element. Every arrangement characteristic or stem characteristic or floral component is touch screen selectable in the maximized "main image" screen mode; individually or by groups. Such selectable UX groups might be represented, highlighted, indicated or individualized as selectable for the user, to notice or made aware that each and/or every component can be made selectable or otherwise. Such selections by the user will display immediate button click real time changes, instantly visible. Certain mobile devices using the customization system will immediately (in real time) allow interactive touch-screen capabilities for floral element selections, including touch screen available stem and color selections and any other selectable elements; when the user touches certain stems, groups of stem or any specific floral element(s) directly on the screen. Certain mobile devices using our the customization system will have the ability to swipe in or out different floral elements, or leave them on the side or in an inventory bar on screen, or any typed in or out.

In another aspect of the disclosure, the customization system may be able to identify and inventory floral supply by size, species, color, quantity, etc. The customization system may have the ability to track consumption by day, week, month year, popularity, and give insightful data as to consumption and even anticipate orders and recommend orders in anticipation. The customization system may notify recipients that specific compositions have been personally designed for them by the individual who customizes the arrangement. In certain embodiments, notifications for unique customized orders may be specifically be shared utilized online, through text messaging and all social media channels. The customization system may allow to the user to save, share, or order customized floral arrangements or any pre-designed floral arrangement within the customization system disclosed herein.

In another aspect of the disclosure herein, the customization system may allow any floral arrangement; whether in a catalog, book, online, live, freestyle or anywhere else, the exclusive ability to be broken into every single separate part, and fragmented into a coded recipe; and repeatable framework diagram model. Breaking any floral arrangement composition into each of its lowest common denominator or core elements, allows the customization system to record, determine specific characteristics for every arrangement component; including size, color, shape style, angle, length and position within a vase, floral container, junction, base, bouquet, arrangement, or grid. The customization system is able to compile the properties and values of every stem: species, angles, lengths, types, sizes, positions, groupings colors; as well as each of characteristic of every floral arrangement component or element and organize or list them in an actual "specification" list for an order fulfiller, florist or anyone to follow that wished to construct the same arrangement. Further the customization system may include a total compilation of retail gift parts comprising a whole design structure which is identifiable and repeatable. Examples include gift baskets, food in flower-type arrangements (such as cookies), cosmetics in flower-like arrangements, or any gift tower selectable arrangement composition. For the purposes of this disclosure, gifts shall be defined as non-flowers (e.g, food such as cookies, cosmetics, etc.) but in a floral type arrangement. The customization system provides virtual programmable diagram frameworks which act as identifiable placeholders to indicate where each arrangement component should be placed.

In another aspect of the disclosure herein, a system and method performed on one or more processing devices located either at a central location or distributed which comprise: providing a preconfigured floral arrangement having componentized arrangement characteristics and componentized stem characteristics; and receiving input selecting the componentized arrangement characteristics and componentized stem characteristics of the floral arrangement. In another aspect, a system and method performed on one or more processing devices which comprise providing a plurality of entry point options; receiving an entry point option selection; providing a plurality of preconfigured floral arrangements; and receiving input selecting componentized arrangement characteristics and componentized stem characteristics of a modified floral arrangement. As discussed above, governing protocols may aesthetically control the options offered in accordance with core design principles. The componentized arrangement characteristics and componentized stem characteristics may include selections made component by component; selections made up of a group of components by group of components; and/or random componentized arrangement characteristics and componentized stem characteristics for selection. The at least one of a plurality of entry point options may include flower groups, color scheme, the componentized stem characteristics, categories, and color match. The flower groups include at least one of primary, secondary, complementary, and foliage. The color match includes picture (submitted by a user) and which corresponds to a predetermined a palette provided by the customization system. The system and method may include monitoring the received selections of the componentized arrangement characteristics and stem characteristics; adjusting inventory management based on the received selections; and adjusting the governing protocols based on inventory. A system method performed on one or more processing devices comprising: providing a plurality of floral container samples; receiving a selection input of at least one of the floral container samples; providing a plurality of entry point options; receiving an entry point option selection; providing a plurality of componentized arrangement characteristics and componentized stem characteristics for selection based on governing protocols. Further disclosed herein is a system and method performed on one or more processing devices comprising: receiving an entry point option selection; and receiving input selecting the componentized arrangement characteristics and componentized stem characteristics of the floral arrangement.

Figure 12:
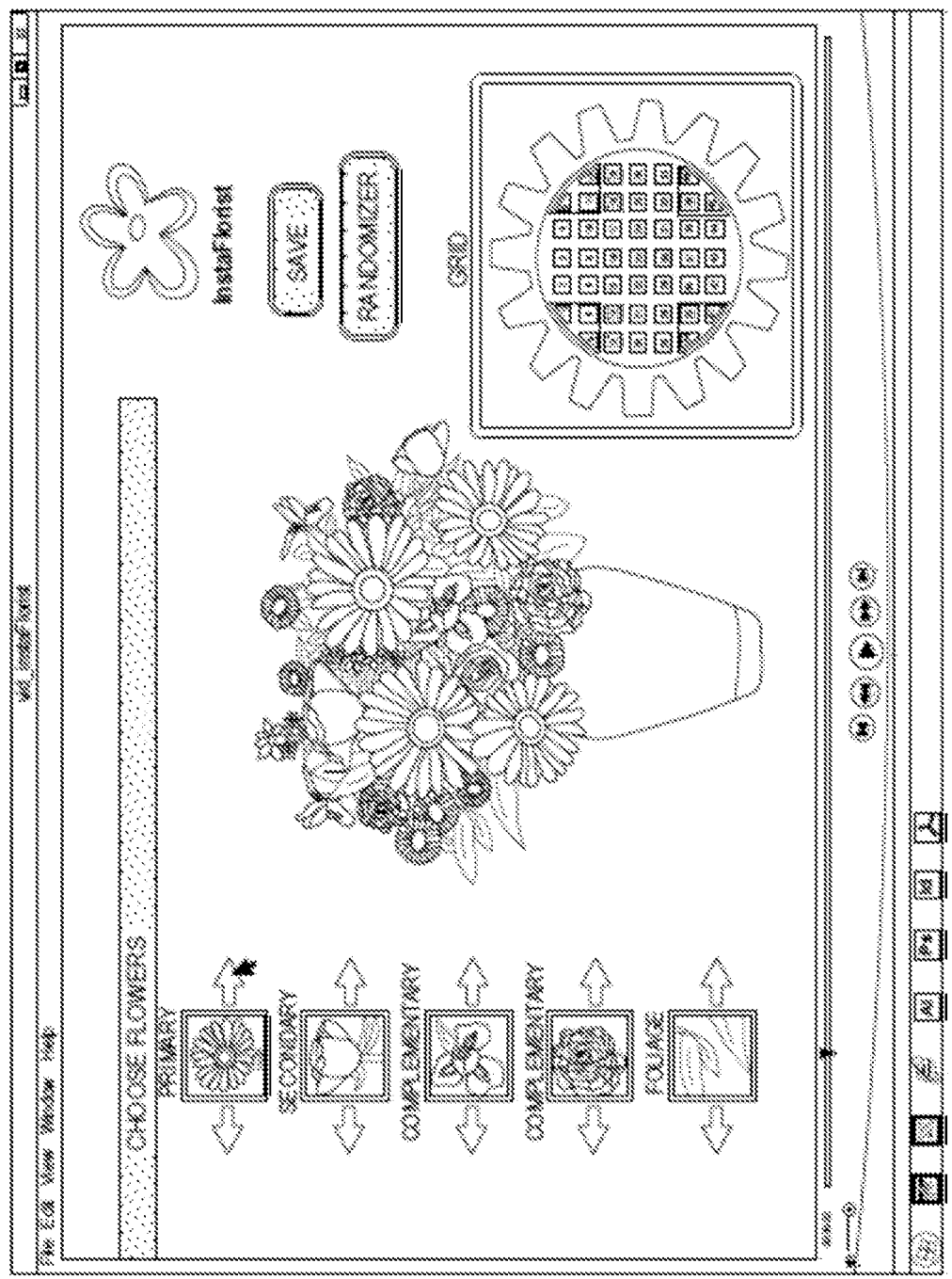
FIG. 12 depicts the virtual floral arrangement with flower group choices on the side.

In the customization system embodiment as shown in FIG. 12, when a particular arrangement is being viewed, modified or created from scratch, it may be selected and "clicked" by the user into maximized image. It is now a main image, maximized image more or less in the middle of the screen. In this maximized image mode, it is now in "customization" mode or customized enabled. This is where the user has the ability to manipulate all floral arrangement characteristics and stem characteristics of this particular selected arrangement. All the (former) equally sized thumbnail arrangement offered in the same category ("Seasonal" for example) may or may not now be displayed somewhere else on the screen now, perhaps in a toggle selectable horizontal selection row of thumbnail arrangements. Anytime any arrangement anywhere in the system is selected and maximized all of its total floral components may or may not be displayed in individual flower group which are represented by thumbnail pictures of a particular species of flower and Left or Right toggle selectable for species or available color of that species. Each flower group has a certain number of selectable stems: floral, non-floral or floral like. These can be updated, or loaded depending on both what the system design rule protocol dictates as a general design rule or as available "in season" flowers or product dictates. Each flower group is stacked according to the design rule principles and core values and accredited philosophies of professional floral design and broken into relevant hierarchy sequence, in a vertical row perhaps. i.e. the top thumbnail flower group image is most likely "Primary Flowers Group" (which are the arrangement's main flowers). The second thumbnail flower group image is most likely labeled "Secondary Flowers Group" (which are the arrangement's second most important flowers). And, so until the last and final (bottom most stacked) thumbnail flower group image is "Foliage". There will be most likely at least a minimum of two thumbnail flower group images, if the user elected to just do a Primary Flower selection and a "Foliage Group." Every other thumbnail flower group image can be closed or maximized, up to 6 or 7 or more total groups. Typically there wouldn't be more than 9 or 10 different floral stem types in one standard size arrangement. At least the Primary Flower Thumbnail Group and the Foliage Thumbnail Group will typically always be present in most but not all embodiments. When a thumbnail flower group image is highlighted it is selectable enabled. When it is Left/Right arrow selected or manipulated it likewise highlights the thumbnail box outline. Every thumbnail flower group image can be locked or toggled Left or Right for all available selections. It is important to note that a standard default of thumbnail flower group images would be between 5 or 6, unless closed or added. It is also important to note that when only a few thumbnail flower group images are chosen to work with, the software takes the diameter and size of the arrangement into consideration, it will know to divide three different species of stem selections (for example) between 30 called out for insertion points (for example purposes). Likewise, if many thumbnail flower group images are chosen to work with, the system will now divide 30 called for insertion points (for example) among a greater amount of different stem species, keeping in mind that it will still basically follow the design rule protocol hierarchy (i.e. the Primary Flowers will typically still get the most insertion points, the Secondary the second most spaces or insertion points and so on). Foliage, generally remains in the same positions in most floral arrangements, no matter how many different flowers are selected. Foliage basically acts as a standard foundation or "filler." It is also important to note that changing the size of the arrangement from Standard, Deluxe (medium) or Premium (Large) will affect the quantity of total stems or inserts within that particular arrangement and within each flower group. It is also important to note that creating a desired composition of flower stems in a standard Vase/Wire style can be transferred to other Style or Shape Arrangements, i.e. Vase/Wire switched to Triadic style or Round style, and vice-versa. In this case, the design rule protocol will adjust all stems accordingly or let the user know that this feature is not available if it is not possible. Likewise, the user may elect to select a different vase after their chosen customized composition of flowers; again the stems will simply adjust in height according to the vase height, whenever available. It is important to note that in the universal principles of accredited floral design it is the vase height that typically determines the height of all stems and floral components. The user may elect to Save, Share on social media or Order their customized, modified or pre-designed arrangements, with every designated stem insertion point and receive that exact actual floral arrangement exactly as it was created, and potentially enhanced with an actual corresponding adhesive grid template for the florist or fulfiller to follow. If a user is a bride-to-be she may elect to send her customized floral arrangement, centerpiece, bouquet or floral composition to a virtual backdrop wedding scene, ballroom, reception hall or alike. There she may elect to select a style of backdrop and other scene criteria like: number of tables, chairs, arrangements, etc. in order to get a virtual sense or preview of her wedding. Non bride-to-be every day users may chose to do the same within a selectable room backdrop with selectable background elements as well. And/or, additionally send this personalized/customized arrangement through social media (Facebook for example) after ordering the arrangement as a notification to the gift recipient. For example, John sent Jane this personalized arrangement today at 11:00 a.m. PST. And, possibly include a personalized message: "Happy Birthday Jane, Love John." Additionally, the social media (Facebook for example) post notification may include naming that particular customized arrangement, "Jane's Birthday Bonanza" arrangement.

In the foregoing specification, the embodiments have been described with reference to specific elements thereof. It will, however, be evident that various modifications and changes may be made thereto without departing from the broader spirit and scope of the embodiments. For example, the reader is to understand that the specific ordering and combination of process actions shown in the process flow diagrams described herein is merely illustrative, and that using different or additional process actions, or a different combination or ordering of process actions can be used to enact the embodiments. The specification and drawings are, accordingly, to be regarded in an illustrative rather than restrictive sense.

It should also be noted that the present embodiments may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The customization system may also be considered to be implemented as a non-transitory computer-readable medium, configured with a computer program, where the non-transitory computer-readable medium so configured causes a computer to operate in a specific and predefined manner. Further, the storage elements of the exemplary computing applications may be relational or sequential (flat file) type computing databases that are capable of storing data in various combinations and configurations.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative sense rather than a restrictive sense.

What is claimed is:

1. A system for designating a plurality of individual floral components of an entire floral composition comprising:
   a network interface unit configured to communicate with a network;
   a processor with an associated memory in communication with the network interface unit and capable of:
   presenting a pre-set floral composition model having governing protocols in accordance with a hierarchy sequence that aesthetically controls options offered and wherein the plurality of individual floral components may be manipulated;
   receiving a reference image;
   displaying the reference image in comparison to the pre-set floral composition model;
   receiving input regarding a first portion of the plurality of individual floral components with regard to arrangement characteristics and stem characteristics; and
   receiving a request that a second portion of the plurality of individual floral components be randomly selected.

2. The system of claim 1, wherein the processor is further capable of: repeating the plurality of individual floral components in a pattern.

3. The system of claim 1, wherein the arrangement characteristics include distance between the plurality of individual floral components.

4. The system of claim 1, wherein the processor is further capable of:
   automatically adjusting a distance between the individual floral components.

5. The system of claim 1, wherein the stem characteristics include a stem angle relative to a fixed plane.

6. The system of claim 1, wherein the reference image is a predetermined floral arrangement.

7. A method performed on one or more processing devices comprising:
   providing a plurality of entry point options;
   receiving an entry point option selection;
   providing a plurality of preconfigured floral arrangements;
   receiving a reference image;
   displaying the reference image in comparison to the plurality of preconfigured floral arrangements;

receiving input selecting componentized arrangement characteristics and componentized stem characteristics of a modified floral arrangement;

providing governing protocols in accordance with a hierarchy sequence that aesthetically controls the plurality of entry point options offered;

monitoring the received input selections of the componentized arrangement characteristics and stem characteristics;

adjusting inventory management based on the received selections; and adjusting the governing protocols and providing guidance accordingly based on inventory.

8. The method of claim 7, wherein the componentized arrangement characteristics and componentized stem characteristics may include selections made component by component.

9. The method of claim 7, wherein the componentized arrangement characteristics and componentized stem characteristics may include selections made group of components by group of components.

10. The method of claim 7, further comprising:
providing random componentized arrangement characteristics and componentized stem characteristics for selection.

11. The method of claim 7, wherein the plurality of entry point options include: flower groups, color scheme, the componentized stem characteristics, categories, and color match.

12. The method of claim 11, wherein the flower groups include at least one of the group consisting of: primary, secondary, complementary, and foliage.

13. The method of claim 7, wherein at least one of a plurality of entry point options is color match which includes a picture match to a palette.

14. The method of claim 7, wherein the processing devices are in a mobile phone.

15. The method of claim 7 wherein the componentized arrangement characteristics and stem characteristics of flowers or plants include at least one of the group consisting of: location, color, species, angle, and height.

16. The method of claim 7, wherein the stem characteristics include a stem angle relative to a fixed plane.

17. The method of claim 7, further comprising:
automatically adjusting a distance between individual floral components of the componentized arrangement characteristics.

* * * * *